3,471,614
HELVETICOSIDE DERIVATIVES
Fritz Kaiser, Lampertheim, Hessen, Wolfgang Schaumann, Mannheim-Waldhof, and Wolfgang Voigtlander, Burstadt, Hessen, Germany, assignors to C. F. Boehringer & Soehne GmbH, MA-Waldhof, Germany, a corporation of Germany
No Drawing. Filed Dec. 27, 1966, Ser. No. 604,588
Claims priority, application Great Britain, Feb. 11, 1966, 6,273/66
Int. Cl. A61k *17/00;* C07c *173/02*
U.S. Cl. 424—182
34 Claims

ABSTRACT OF THE DISCLOSURE

Derivatives of helveticoside of the formula

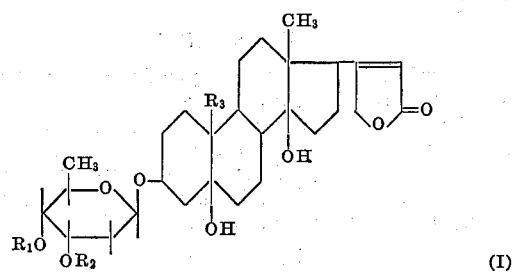

wherein $R_1$ and $R_2$ are each members of the group of unsubstituted and substituted acyl containing 1–4 carbon atoms with the proviso that only one of $R_1$ and $R_2$ is hydrogen and $R_3$ is an aldehyde group or —$CH_2OX$ wherein X is hydrogen or an unsubstituted or substituted acyl containing 1–4 carbon atoms. All of the above compounds are novel with the exception of those where $R_1$ and $R_2$ are both acetyl and $R_3$ is an aldehyde or acetylated methylol group. The compounds of Formula I are useful chemotherapeutic agents because of effectiveness in treating cardiac conditions. The said compounds are readily resorbed from the alimentary tract and preferably formulated in a form suitable for oral or rectal administration.

---

This invention relates to helveticoside derivatives and to methods of compounding and using the same. More particularly this invention relates to derivatives of helveticoside some of which are novel, the process of preparing the same, the novel pharmaceutical compositions containing the same as active materials and to methods of compounding and using said compositions.

The derivatives of helveticoside according to the present invention have the following structure:

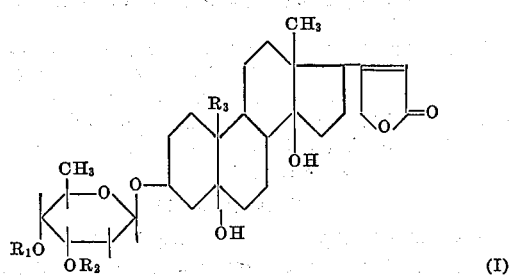

wherein $R_1$ and $R_2$, which may be the same or different, are each acyl radicals containing 1–4 carbon atoms, which may be substituted by halogen atoms or alkoxy, alkenoxy or acyloxy radicals, wherein one of the two radicals $R_1$ and $R_2$ can also be a hydrogen atom, and $R_3$ is an aldehyde group or the radical $CH_2OX$, X being a hydrogen atom or an acyl radical containing 1–4 carbon atoms, which may be substituted by halogen atoms or alkoxy, or alkenoxy or acyloxy radicals.

All of the compounds of the above structural Formula I are new with the exception of those in which $R_1$ and $R_2$ are both acetyl groups and $R_3$ is an aldehyde group or an acetylated methylol group.

It is known that helveticoside and its reduction product, helveticosol, demonstrate, when administered intravenously to animals or humans, a very strong cardiac action comparable with strophanthin. However, as in the case of strophanthin, the helveticoside or helveticosol is only very slightly effective when orally administered. On the other hand, the activity on intravenous administration of both glycosides decreases considerably when acylated.

In accordance with the invention, it has now, surprisingly, been found that acyl glycosides of the above structural Formula I are substantially completely resorbed and, furthermore, show, enterically, a substantially greater effect than in the case of intravenous application. As a result, the compounds of Formula I are suitable for use as "oral strophanthins" for the treatment of cardiac insufficiencies.

The mono- or poly-acylated derivatives of helveticoside or of helveticosol are prepared according to the conventional methods, and preferably are prepared by the reaction of helveticoside or of helveticosol with an acylating agent conventional in sugar chemistry, such as an acid anhydride, acid imidazolide, acid chloride in pyridine, free acids and p-toluene-sulfochloride in pyridine and the like.

It is hereby made possible first, only to acylate one of the two hydroxyl groups of the glycosidally-bound digitoxose and thus to obtain the monoacyl derivatives. The monoacyl derivatives can again, if desired, be reacted with reactive derivatives of other carboxylic acids to give mixed acyl derivatives. For the preparation of derivatives of helveticosol, the already acylated derivatives of helveticoside are reduced in known manner and, if desired, acylated again. However, for the preparation of triacyl derivatives, it is also possible to start directly from free helveticosol.

In order to prepare 4'-monoacyl-helveticosides, helveticoside can be reacted in an inert solvent with an appropriate acid anhydride, such as acetic anhydride, propionic anhydride or butyric anhydride, in the presence of a tertiary amine. In the special case of 4'-monoformylhelveticoside, it is preferable to react helveticoside in an inert solvent with the mixed anhydride of formic acid with acetic acid in the presence of a tertiary amine.

The 4'-monoacyl-helveticosides can be conveniently converted into the corresponding 3'-monoacyl compounds by warming in aqueous solution.

The diacyl derivatives of helveticoside can be prepared by reacting helveticoside with a reactive derivative of an appropriate acid, such as formic acid, acetic acid, dichloroacetic acid, propionic acid or butyric acid.

The mixed diacyl derivatives of helveticoside are preferably obtained by first preparing a 4'-monoacyl-helveticoside and then acylating the 3'-hydroxyl group with a different acid. Thus, for example, in order to prepare 3'-acetyl-4'-propionyl-helveticoside, helveticoside is first reacted with propionic anhydride in an inert solvent and in the presence of a tertiary amine to give 4'-propionyl-helveticoside which, in turn, is reacted with a reactive derivative of acetic acid.

As mentioned above, the acyl derivatives of helveticosol can be obtained by reducing, by the conventional method, the corresponding acyl derivatives of helveticoside. Thus, for example, reduction of diaectyl-helveticoside and of dipropionyl-helveticoside yields diacetyl-helveticosol and dipropionyl-helveticosol, respectively. The triacyl derivatives of helveticosol can be prepared from the corresponding diacyl derivatives by reaction with a reactive derivative of an acid. Thus, the reaction of a reactive derivative of propionic acid with 3',4'-dipropionyl-helveticosol and with 3',4'-diacetyl-helveticosol produces 3',4'-dipropionyl-19-O-propionyl - helveticosol and 3',4' - diacetyl-19-O-propionyl-helveticosol, respectively.

The preparation of these compounds is more fully described in the following examples. It is to be understood, however, that the examples are illustrative of the compounds embraced by this invention and of the methods for their preparation and are not to be construed as limiting the invention to the particular compounds or methods specifically described.

EXAMPLE 1

1 g. helveticoside, dissolved in 10 ml. pyridine and 5 ml. chloroform, was mixed with 1 g. ethoxyacetyl chloride in 3 ml. chloroform and allowed to stand at room temperature for 24 hours. The reaction mixture was then diluted with 150 ml. water, extracted with chloroform, the chloroform phase washed with sodium carbonate solution and water, dried over anhydrous sodium sulfate and evaporated in a vacuum. The resulting residue was fractionated over silica gel with benzene-ethyl acetate (10–50%). After crystallization from chloroform-ether, there were obtained 630 mg. 4'-mono-(ethoxyacetyl)-helveticoside having a melting point of 192–194° C.

EXAMPLE 2

1 g. helveticoside and 2.2 g. ethoxyacetyl chloride were reacted in the manner described in Example 1 and the reaction mixture then worked up as described in that example. There were obtained 780 mg. 3',4'-di-(ethoxyacetyl)-helveticoside having a melting point of 166–169° C.

EXAMPLE 3

1 g. helveticoside in 10 ml. pyridine which had been cooled in ice, was added to an ice-cooled mixture of 900 mg. α-chloropropionic acid, 20 ml. pyridine and 3 g. p-toluene-sulfochloride, and the reaction mixture left to stand, with ice cooling, for 60 minutes, then diluted with 250 ml. water, extracted with chloroform and evaporated. The crude product was dissolved in benzene-ethyl acetate (5%) and fractionated over silica gel with benzene-ethyl acetate (5–50%). From the benzene plus 35% ethyl acetate fraction, there were obtained, after crystallization from chloroform-petroleum ether, 750 mg. 3',4'-di-(α-chloropropionyl)-helveticoside having a melting point of 123–125° C.

EXAMPLE 4

1 g. helveticoside in 10 ml. pyridine was reacted with 900 mg. α,α-dichloropropionic acid in 20 ml. pyridine and 3 g. p-toluene-sulfochloride in the maner described in Example 3 and the reaction mixture thereafter worked up as described in that example. After recrystallization from chloroform-petroleum ether, there were obtained 810 mg. 3',4'-di-(α,α-dichloropropionyl)-helveticoside having a melting point of 134–136° C.

EXAMPLE 5

1 g. helveticoside in 10 ml. pyridine was reacted with 1.8 g. acetyl-glycolic acid and 6 g. p-toluene-sulfochloride in 40 ml. pyridine in the manner described in Example 3 and then worked up according to that example. Following crystallization from acetone-cyclohexane, there were obtained 960 mg. 3',4'-di(acetylglycolyl)-helveticoside having a melting point of 106–109° C.

EXAMPLE 6

1 g. helveticoside in 10 ml. pyridine was reacted with 900 mg. methoxyacetic acid and 3 g. p-toluene-sulfochloride in 20 ml. pyridine according to the method of Example 3 and then worked up in the same manner. After crystallization from chloroform-ether, there were obtained 790 mg. 3',4'-di-(methoxyacetyl)-helveticoside having a melting point of 187–189° C.

EXAMPLE 7

1 g. helveticoside in 10 ml. pyridine was reacted with 1.8 g. α-methoxy-propionic acid and 6 g. p-toluene-sulfochloride in 40 ml. pyridine by the method described in Example 3 and then worked up in the same manner. After crystallization from chloroform-ether, there were obtained 830 mg. 3',4'-di-(α-methoxypropionyl)-helveticoside having a melting point of 108–110° C.

EXAMPLE 8

1 g. helveticoside in 10 ml. pyridine was reacted with 900 mg. α-ethoxy-propionic acid and 3 g. p-toluene-sulfochloride in 20 ml. pyridine by the method described in Example 3 and then worked up in the same manner. Following crystallization from chloroform-ether-petroleum ether, there were obtained 760 mg. 3',4'-di-(α-ethoxypropionyl)-helveticoside having a melting point of 96–98° C.

EXAMPLE 9

1 g. helveticoside in 10 ml. pyridine was reacted with 1.8 g. acetyl-lactic acid and 6 g. p-toluene-sulfochloride in 40 ml. pyridine according to the method described in Example 3 and then worked up in the same manner. After crystallization from chloroform-ether-petroleum ether, there was obtained 780 mg. 3',4'-di-(acetyl-lactyl)-helveticoside having a melting point of 103–105° C.

EXAMPLE 10

1 g. helveticoside in 10 ml. pyridine was reacted with 900 m. n-propoxy-acetic acid and 3 g. p-toluene-sulfochloride in 20 ml. pyridine by the method described in Example 3 and then worked up in the same manner. Following crystallization from chloroform-ether, there were obtained 720 mg. 3',4'-di-(n-propoxy-acetyl)-helveticoside having a melting point of 148–150° C.

EXAMPLE 11

1 g. helveticoside in 10 ml. pyridine was reacted with 900 mg. α-n-propoxy-propionic acid and 3 g. p-toluene-sulfochloride in 20 ml. pyridine by the procedure disclosed in Example 3 and then worked up in the same manner. After crystallization from chloroform-ether-petroleum ether, there were recovered 760 mg. 3',4'-di-(α-n-propoxy-propionyl)-helveticoside having a melting point of 79–81° C.

EXAMPLE 12

1 g. helveticoside in 10 ml. pyridine was reached with 400 mg. α-chloropropionic acid and 1.5 g. p-toluene-sulfochloride in 20 ml. pyridine by the method described in Example 3 and then worked up in the same manner. After crystallization from chloroform-ether-petroleum ether, there were obtained 660 mg. 4'-mono-(α-chloropropionyl)-helveticoside having a melting point of 108–111° C.

In an analogous manner 760 mg. di-allyloxyacetyl-helveticoside (M.P. 79–81° C.) were obtained by reaction of 1 g. helveticoside and 900 mg. allyloxy-acetic acid, and 730 mg. tri-ethoxyacetyl-helveticosol (M.P. 69–71) were obtained by reaction of 1 g. helveticosol and 1.8 g. ethoxy-acetic acid.

EXAMPLE 13

2 g. helveticoside were dissolved in 30 ml. dimethylformamide. 2 ml. triethylamine and 10 ml. formic acid-acetic anhydride (1:1) were then added thereto. The reaction mixture was allowed to stand at room temperature for 3 hours. Thereafter, it was diluted with ten times the amount of water, extracted with chloroform, the chloroform phase washed twice with water, dried over anhydrous sodium sulfate, concentrated and precipitated with ligroin. Following crystallization from chloroform-ether, there were obtained 1.6 g. 4′-monoformyl-helveticoside having a melting point of 210–213° C.

EXAMPLE 14

2 g. helveticoside were dissolved in 10 ml. pyridine and mixed with stirring, within 1 hour with 60 ml. formic acid-acetic anhydride (1:1). Thereafter, the reaction mixture was diluted with 500 ml. water, extracted with chloroform, the chloroform phase washed with 1 N sulfuric acid and water, dried over anhydrous sodium sulfate and evaporated in a vacuum. The crude product was crystallized from acetone-ether. There were recovered 2.1 g. 3′,4′-diformyl-helveticoside having a melting point of 205–207° C.

EXAMPLE 15

2 g. helveticoside were dissolved in 30 ml. dimethyl formamide. 2 ml. triethylamine and 10 ml. acetic anhydride were then added thereto. The reaction mixture was permitted to stand for 3 hours at room temperature and then was diluted with ten times the amount of water, extracted with chloroform, the chloroform phase washed twice with water, dried over anhydrous sodium sulfate, concentrated and precipitated with ligroin. After crystallization from chloroform-ether, there were obtained 1.55 g. 4′-monoacetyl-helveticoside having a melting point of 209–212° C.

EXAMPLE 16

500 mg. 4′-monoacetyl-helveticoside were dissolved in 125 ml. ethanol, diluted with 2.5 liters water and heated for 2 hours at 95° C. The reaction mixture was thereafter extracted with chloroform, evaporated and recrystallized from chloroform-ether. There were obtained 400 mg. 3′-monoacetyl-helveticoside having a melting point of 173–175° C.

EXAMPLE 17

2 g. helveticoside were dissolved in 30 ml. dimethyl formamide. 2 ml. triethylamine and 10 ml. propionic anhydride were added to the resulting solution. The reaction mixture was left to stand at room temperature for 3.5 hours. Thereafter it was diluted with ten times the amount of water, extracted with chloroform, the chloroform phase washed twice with water, dried over anhydrous sodium sulfate, concentrated and precipitated with ligroin. Following crystallization from chloroform-ether, there were obtained 1.7 g. 4′-monopropionyl-helveticoside having a melting point of 196–199° C.

EXAMPLE 18

500 mg. 4′-monopropionyl-helveticoside were dissolved in 125 ml. ethanol, diluted with 2.5 liters water and heated for 2 hours at 95° C. Thereafter, the reaction mixture was extracted five times with 200 ml. amounts of chloroform, evaporated and crystallized from chloroform-ether. There were obtained 380 mg. 3′-monopropionyl-helveticoside having a melting point of 122–125° C.

EXAMPLE 19

2 g. helveticoside were dissolved in 10 ml. pyridine and 5 ml. propionic anhydride. The reaction mixture was left to stand for 24 hours at room temperature. Thereafter it was diluted with water, extracted with chloroform, concentrated, precipitated with ligroin and crystallized from chloroform-ether. There were obtained 1.55 g. 3′,4′-dipropionyl-helveticoside having a melting point of 186–190° C.

EXAMPLE 20

1 g. helveticoside was dissolved in 15 ml. pyridine and 10 g. dichloroacetic anhydride. The reaction mixture was allowed to stand at room temperature for 24 hours. Thereafter, it was diluted with water, extracted with chloroform, evaporated and fractionated with benzene-ethyl acetate over silica gel. The benzene fractions which contained 20% ethyl acetate yielded after crystallization from chloroform-ether, 720 mg. 3′,4′-di-(dichloroacetyl)-helveticoside having a melting point of 210° C. (decomp.).

EXAMPLE 21

500 mg. 4′-monopropionyl-helveticoside were dissolved in 12 ml. pyridine and 2.5 ml. acetic anhydride. The mixture was allowed to stand at room temperature for 24 hours. Thereafter, it was diluted with water, extracted with chloroform, evaporated and crystallized from chloroform-ether. There were obtained 370 mg. 3′-acetyl-4′-propionyl-helveticoside having a melting point of 175–177° C.

EXAMPLE 22

1 g. 3′,4′-diacetyl-helveticoside (see W. Schlegel, Ch. Tamm and T. Reichstein, Helv. Chim. Acta 38, 1013/1955) was dissolved in 5 ml. pyridine and mixed with a solution of 260 mg. sodium borohydride in 26 ml. pyridine. The reaction mixture was permitted to stand at room temperature for 4 hours. Thereafter, it was diluted with water, acidified with 1 N sulfuric acid, extracted with chloroform-ether (2:1) and evaporated. The crude product was purified with benzene plus 20% ethyl acetate over silica gel. After crystallization from chloroform-ether, there were obtained 670 mg. 3′,4′-diacetyl-helveticosol having a melting point of 217–220° C.

EXAMPLE 23

1 g. 3′,4′-dipropionyl-helveticoside was dissolved in 5 ml. pyridine and mixed with a solution of 300 mg. sodium borohydride in 25 ml. pyridine. The reaction mixture was left to stand at room temperature for 4 hours. Thereafter, 1 N sulfuric acid was added (up to pH 6) and the acidified solution extracted with chloroform-ethanol (2:1), washed with water, dried over anhydrous sodium sulfate and evaporated. The residue was fractionated with benzene-ethyl acetate over silica gel. From the benzene plus 20% ethyl acetate fractions, there were obtained, after crystallization from chloroform-petroleum ether, 580 mg. 3′,4′-dipropionyl-helveticosol having a melting point of 112–115° C.

EXAMPLE 24

500 mg. 3′,4′-dipropionyl-helveticosol were dissolved in 5 ml. pyridine and 2.5 ml propionic anhydride. After 24 hours, the reaction mixture was diluted with water, extracted with chloroform, evaporated and crystallized from chloroform-petroleum ether. There were obtained 420 mg. 3′,4′-10-O-tripropionyl-helveticosol having a melting point of 92–95° C.

EXAMPLE 25

800 mg. 3′,4′-diacetyl-helveticosol were dissolved in 4 ml. pyridine and 2 ml. propionic anhydride. The reaction mixture was permitted to stand at room temperature for 5 hours. Thereafter, it was precipitated with ligroin and fractionated with benzene-ethyl acetate over silica gel. The benzene plus 40% ethyl acetate fractions yielded after crystallization from chloroform-ether, 450 mg. 3′,4′-diacetyl-19-O-propionyl-helveticosol having a melting point of 136–140° C.

EXAMPLE 26

2 g. helveticoside were dissolved in 30 ml. dimethyl formamide. 2 ml. triethylamine and 10 ml. butyric anhydride were then added thereto. The reaction mixture was left to stand at room temperature for 3 hours. Thereafter, it was diluted with water, extracted with chloroform, concentrated and precipitated with ligroin. After crystallization from chloroform-ether, there were obtained 1.64 g. 4′-monobutyryl-helveticoside having a melting point of 172–174° C.

EXAMPLE 27

500 mg. 4'-monobutyryl-helveticoside were dissolved in 125 ml. ethanol, diluted with 2.5 liters water and heated for 2 hours at 95° C. Thereafter, the reaction mixture was extracted with chloroform, evaporated and crystallized from chloroform-ether. There were recovered 410 mg. 3'-monobutyryl-helveticoside having a melting point of 151–153° C.

EXAMPLE 28

2 g. helveticoside were dissolved in 10 ml. pyridine and 5 ml. butyric anhydride. The reaction mixture was allowed to stand at room temperature for 24 hours. Thereafter, it was diluted with water, extracted with chloroform, concentrated, precipitated with ligroin and crystallized from chloroform-ether. There were obtained 1.66 g. 3',4'-dibutyryl-helveticoside having a melting point of 158–161° C.

One of the aspects of the invention is to provide pharmaceutical compositions containing one or more of the compounds of general Formula I in admixture with a significant amount of a solid or liquid pharmaceutical carrier for use in the treatment of cardiac disorders and particularly cardiac insufficiency. The compositions may take the form of tablets, powders, capsules or other dosage forms which are suitable for oral admistration. In addition, the compositions may be formulated for use as suppositories, in particular, suppositories adapted for rectal administration.

Thus, for instance, solid compositions suitable for oral administration include compressed tablets, pills, dispersible powders and granules. In such solid compositions, one or more of the compounds of general Formula I is or are mixed with at least one inert diluent, such as calcium carbonate, potato starch, corn starch, alginic acid, talc, agar-agar or lactose. Anhydrous sodium sulfate can also be added to protect the acyl radicals present in the active materials from saponification by atmospheric moisture. The compositions may also comprise, as is normal practice, additional substances other than inert diluents, for example, lubricating agents, such as magnesium stearate.

The compositions according to the present invention for oral administration include capsules of absorbable material, such as gelatine, containing one or more of the compounds of general Formula I, with or without the addition of diluents and excipients.

The percentage of active ingredient in the compositions according to the present invention may be varied, it being necessary that it should constitute a proportion such that a suitable dosage is provided so that the desired therapeutic effect is obtained. Obviously, several unit dosage forms may be administered at about the same time. In clinical trials, it has been found that a daily dosage of 1–10 mg. suffices, most patients responding favorably to a daily dosage of 1–5 mg. When such daily dosages are administered to decompensated cardiac patients, a clear improvement in the circulatory condition and in the reduction of edema is observed.

The following examples serve to illustrate pharmaceutical compositions according to the present invention:

EXAMPLE 29

Tablets were prepared by the conventional tabletting methods containing:

| | Mg. |
|---|---|
| 3',4'-diacetyl-helveticoside | 1.0 |
| Anhydrous sodium sulfate | 10.0 |
| Lactose | 57.0 |
| Starch | 57.0 |
| Talc | 8.7 |
| Agar-agar | 4.0 |
| Magnesium stearate | 1.0 |
| Citric acid | 1.3 |

EXAMPLE 30

Tablets were prepared containing:

| | Mg. |
|---|---|
| 3',4'-diformyl-helveticoside | 0.2 |
| Anhydrous sodium sulfate | 5.8 |
| Lactose | 114.0 |
| Aerosil | 1.4 |
| Polyglycol 20,000 | 7.0 |
| Talc | 6.6 |
| Methyl cellulose | 3.0 |
| Magnesium stearate | 0.7 |
| Citric acid | 1.3 |

EXAMPLE 31

Tablets were prepared containing:

| | Mg. |
|---|---|
| 3',4'-dipropionyl-helveticoside | 1.0 |
| Anhydrous sodium sulfate | 5.0 |
| Lactose | 114.0 |
| Polyglycol 20,000 | 7.0 |
| Aerosil | 1.4 |
| Talc | 6.6 |
| Magnesium stearate | 0.7 |
| Methyl cellulose | 3.0 |
| Citric acid | 1.3 |

EXAMPLE 32

Tablets were prepared containing:

| | Mg. |
|---|---|
| 4'-monopropionyl-helveticoside | 0.2 |
| Anhydrous sodium sulfate | 4.8 |
| Lactose | 115.0 |
| Polyglycol 20,000 | 7.0 |
| Aerosil | 1.4 |
| Talc | 6.6 |
| Magnesium stearate | 0.7 |
| Methyl cellulose | 3.0 |
| Citric acid | 1.3 |

EXAMPLE 33

A mixture was prepared consisting of:

| | Mg. |
|---|---|
| 3',4'-diacetyl-helveticoside | 1.0 |
| Ground nut oil | 100.0 |
| Hydrogenated vegetable oil | 10.0 |
| Soya bean lecithin | 3.0 |

This mixture was used for filling a Scherer capsule.

In order to establish that the esterification of the difficulty resorbable helveticoside results in readily resorbable compounds, the following experiments were carried out, wherein, contrary to the conventional usage, the compounds were administered enterally: The electrocardiographs of guinea pigs under urethane-narcosis were observed on an oscilloscope. 5 mg./kg. of test compound were administered intraduodenally in 10 ml./kg. of 5% dimethyl acetamide and the time for heart stoppage determined. If the animal was alive after 2 hours, the experiment was discontinued.

The lethal dose of helveticoside in guinea pigs, when administered intravenously (continuous infusion), amount to 0.69 mg./kg. Following a 6-fold dose administered intraduodenally, only 4 of the 6 animals after 110 minutes had heart stoppage. The resorption of helveticoside thus lies under 20%.

Diacetyl helveticoside and triacetyl helveticosol were were inactive when administered in an amount of 5 mg./kg. introduodenally. 10 mg./kg. of diacetyl helveticoside resulted in death when administered by this route. The i.v. lethal dose of diacetyl helveticoside, however, is 8.1 mg./kg. From this it can be calculated that, in contrast to helveticoside, diacetyl helveticoside was readily resorbed but is, however, much less active.

The activity of the esters of the invention are set out in the following table:

INTRADUODENAL EFFECT OF 5 MG./KG. ON GUINEA PIGS

| Compound | Example No. | Deaths | Time, min. |
|---|---|---|---|
| 4'-monoacetyl-helveticoside | 15 | 6/8 | 66 |
| Diformyl-helveticoside | 14 | 6/6 | 63 |
| Diacetyl-helveticosol | 22 | 6/6 | 36 |
| Dipropionyl-helveticoside | 19 | 6/6 | 57 |
| 4'-monopropionyl-helveticoside | 17 | 6/6 | 35 |
| Di-dichloracetyl-helveticoside | 20 | 6/8 | 89 |
| 3'-monopropionyl-helveticoside | 18 | 6/6 | 86 |
| Dipropionyl-helveticosol [1] | 23 | 6/6 | 18 |
| Tripropionyl-helveticosol | 24 | 6/6 | 29 |

[1] 3 mg./kg. i.d.

| Compound | Example No. | Deaths | Time, min. |
|---|---|---|---|
| 4'-mono-ethoxy-acetyl helveticoside | 1 | 5/6 | 80 |
| Di-ethoxyacetyl helveticoside | 2 | 6/6 | 30 |
| Di-α-chlorpropionyl-helveticoside | 3 | 4/6 | 76 |
| Di-α,α-dichlorpropionyl-helveticoside | 4 | 5/6 | 88 |
| Di-acetylglycolyl-helveticoside | 5 | 5/6 | 85 |
| Di-methoxyacetyl-helveticoside | 6 | 6/6 | 84 |
| Di-α-methoxypropionyl-helveticoside | 7 | 6/6 | 63 |
| Di-α-ethoxypropionyl-helveticoside | 8 | 5/6 | 39 |
| Di-acetyl-lactyl-helveticoside | 9 | 5/6 | 45 |
| Di-n-propyloxyacetyl-helveticoside | 10 | 6/6 | 44 |
| Di-α-n-propyloxy-propionyl-helveticoside | 11 | 6/6 | 67 |
| 4'-mono-α-chlorpropionyl-helveticoside | 12 | 3/6 | 37 |

We claim:
1. A helveticoside derivative of the formula:

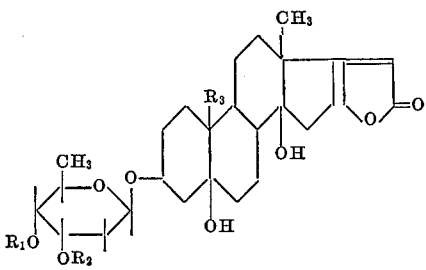

wherein $R_1$ and $R_2$ are each a member selected from the group consisting of hydrogen, unsubstituted and substituted acyl containing 1–4 carbon atoms wherein said substituent is a member selected from the group consisting of chlorine, lower alkoxy, lower alkenoxy and lower acyloxy, and $R_3$ is a member selected from the group consisting of an aldehyde group and —$CH_2OX$, wherein X is a member selected from the group consisting of hydrogen, unsubstituted and substituted acyl containing 1–4 carbon atoms wherein said substituent is a member selected from the group consisting of chlorine, lower alkoxy, lower alkenoxy and lower acyloxy with the proviso that only one of $R_1$ and $R_2$ is simultaneously hydrogen and, when $R_1$ and $R_2$ are both acetyl, $R_3$ is other than an aldehyde or acetylated methylol group.

2. A compound according to claim 1 designated 4'-mono-(ethoxyacetyl)-helveticoside.
3. A compound according to claim 1 designated 3'-4'-di-(ethoxyacetyl)-helveticoside.
4. A compound according to claim 1 designated 3'-4'-di-(α-chloropropionyl)-helveticoside.
5. A compound according to claim 1 designated 3'-4'-di-(α,α-dichloropropionyl)-helveticoside.
6. A compound according to claim 1 designated 3'-4'-di-(acetylglycolyl)-helveticoside.
7. A compound according to claim 1 designated 3'-4'-di-(methoxyacetyl)-helveticoside.
8. A compound according to claim 1 designated 3'-4'-di-(α-methoxypropionyl)-helveticoside.
9. A compound according to claim 1 designated 3'-4'-di-(α-ethoxypropionyl)-helveticoside.
10. A compound according to claim 1 designated 3'-4'-di-(acetyl-lactyl)-helveticoside.
11. A compound according to claim 1 designated 3'-4'-di-(n-propoxy-acetyl)-helveticoside.
12. A compound according to claim 1 designated 3'-4'-di-(α-n-propoxy-propionyl)-helveticoside.
13. A compound according to claim 1 designated 4-'mono-(α-chloropropionyl)-helveticoside.
14. A compound according to claim 1 designated 4'-monoformyl-helveticoside.
15. A compound according to claim 1 designated 3'-4'-diformyl-helveticoside.
16. A compound according to claim 1 designated 4'-monoacetyl-helveticoside.
17. A compound according to claim 1 designated 3'-monoacetyl-helveticoside.
18. A compound according to claim 1 designated 4'-monopropionyl-helveticoside.
19. A compound according to claim 1 designated 3'-monopropionyl-helveticoside.
20. A compound according to claim 1 designated 3'-4'-dipropionyl-helveticoside.
21. A compound according to claim 1 designated 3'-4'-di-(dichloroacetyl)-helveticoside.
22. A compound according to claim 1 designated 3'-acetyl-4'-propionyl-helveticoside.
23. A compound according to claim 1 designated 3'-4'-diacetyl-helveticosol.
24. A compound according to claim 1 designated 3'-4'-dipropionyl-helveticosol.
25. A compound according to claim 1 designated 3',4',19-O-tripropionyl-helveticosol.
26. A compound according to claim 1 designated 3'-4'-diacetyl-19-O-propionyl-helveticosol.
27. A compound according to claim 1 designated 4'-monobutyryl-helveticoside.
28. A compound according to claim 1 designated 3'-monobutyryl-helveticoside.
29. A compound according to claim 1 designated 3'-4'-dibutyryl-helveticoside.
30. A therapeutic composition, for treatment of cardiac disorder, comprising at least one compound having the formula:

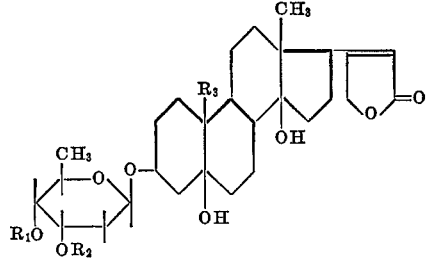

wherein $R_1$ and $R_2$ are each a member selected from the group consisting of hydrogen, unsubstituted and substituted acyl containing 1–4 carbon atoms wherein said substituent is a member selected from the group consisting of chlorine, lower alkoxy, lower alkenoxy and lower acyloxy, and $R_3$ is a member selected from the group consisting of an aldehyde group and —$CH_2OX$, wherein X is a member selected from the group consisting of hydrogen, unsubstituted and substituted acyl containing 1–4 carbon atoms wherein said substituent is a member selected from the group consisting of chlorine, lower alkoxy, lower alkenoxy, and lower acyloxy with the proviso that only one of $R_1$ and $R_2$ is simultaneously hydrogen in admixture with a pharmacologically-acceptable carrier in dosage unit form.
31. A pharmaceutical composition according to claim 30 in dosage unit form suitable for enteral administration.
32. A pharmaceutical composition according to claim 30 in dosage unit form suitable for oral administration.
33. A method of treating a decompensated cardiac patient, which comprises enterally administering to such a patient in an effective amount of from 1–10 mg. of the composition according to claim 20 per day.

34. A method of treating a decompensated cardiac patient, which comprises enterally administering to such a patient in an effective amount of from 1–5 mg. of the composition according to claim 20 per day.

References Cited

Nagata et al. "Chem. Abst.," vol. 51, 1957, p. 10383(b).

Nikonovich et al. "Chem. Abst.," vol. 60, 1964, p. 10776(a).

ELBERT L. ROBERTS, Primary Examiner

JOHNNIE R. BROWN, Assistant Examiner

U.S. Cl. X.R.

260—210.5

UNITED STATES PATENT OFFICE
CERTIFICATE OF CORRECTION

Patent No. 3,471,614                            October 7, 1969

Fritz Kaiser et al.

It is certified that error appears in the above identified patent and that said Letters Patent are hereby corrected as shown below:

In the heading to the printed specification, line 10, after "6,273/66" insert -- ; Sept. 5, 1966, 39,548/66 --. Column 4, line 33, "900 m." should read -- 900 mg. --; line 51, "reached" should read -- reacted --. Column 6, line 25, "chloroform-ether" should read -- chloroform-ethanol --; line 52, "3′,4′-10-O-tripropionyl-helveticosol" should read -- 3′,4′-19-O-tripropionyl-helveticosol --. Column 8, lines 50 and 51, "difficulty" should read -- difficultly --; line 63, "amount" should read -- amounts --; line 70, "introduodenally" should read -- intraduodenally --. Column 10, line 40, "disorder" should read -- disorders --.

Signed and sealed this 2nd day of June 1970.

(SEAL)
Attest:

EDWARD M. FLETCHER, JR.                     WILLIAM E. SCHUYLER, JR.
Attesting Officer                              Commissioner of Patents